United States Patent Office 3,803,240
Patented Apr. 9, 1974

3,803,240
2-(2,6-SUBSTITUTED-PHENYL)-1,3-INDANDIONES
John A. Durden, South Charleston, W. Va., and Anthony A. Sousa, Raleigh, N.C., assignors to Union Carbide Corporation, New York, N.Y.
No Drawing. Continuation-in-part of application Ser. No. 816,024, Apr. 14, 1969. This application May 13, 1971, Ser. No. 143,205
Int. Cl. C07c 49/80
U.S. Cl. 260—590      3 Claims

ABSTRACT OF THE DISCLOSURE

A new series of 2-(2',6'-substituted-phenyl)-1,3-indandione compounds have been found to have exceptional miticidal and herbicidal activity. These compounds may be represented by the following general formula:

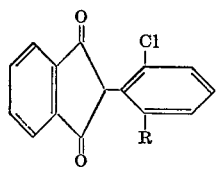

where R is lower alkyl, lower alkoxy, fluorine or bromine.

---

This application is a continuation-in-part of U.S. application Ser. No. 816,024 filed Apr. 14, 1969.

The novel compounds of this invention are 2-(2',6'-substituted phenyl)-1,3-indandione compositions corresponding to the following general formula:

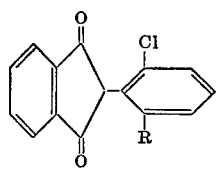

where R is lower alkyl, lower alkoxy, fluorine or bromine.

Illustrative of the new compositions of our invention are the following:

2-(2'-bromo-6'-chlorophenyl)-1,3-indandione
2-(2'-chloro-6'-fluorophenyl)-1,3-indandione
2-(2'-chloro-6'-methylphenyl)-1,3-indandione
2-(2'-chloro-6'-ethylphenyl)-1,3-indandione
2-(2'-chloro-6'-methoxyphenyl)-1,3-indandione We have found that the compositions falling within the scope of the generic formula given above exhibit varying degrees of biological activity. The compositions in which the functional groups are relatively small generally exhibit higher activity and thus in case of alkyl substituents methyl and ethyl are preferred and in the case of alkoxy substituents methoxy and ethoxy are preferred.

All of these compounds can be prepared conveniently by reacting an appropriately substituted benzaldehyde composition with an appropriately substituted phthalide composition in accordance with the general reaction scheme set forth below (Equation 1) wherein R is as defined above.

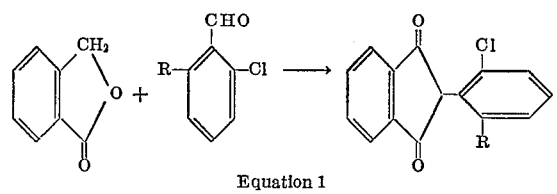

Equation 1

Alternatively, 2-aryl indandiones may be prepared by reacting arylacetic acids with phthalic anhydride in the presence of salts such as sodium acetate at temperatures of 200° to 280° C. to produce the corresponding benzylidenephthalide. This intermediate may be rearranged to the isomeric 2-aryl-1,3-indandione by treatment with basic reagents such as sodium methoxide in methanol. This sequence is shown in Equation 2 below.

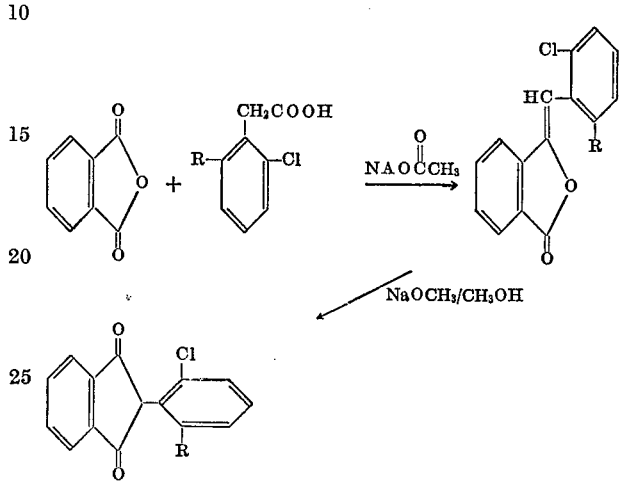

Equation 2

The following representative specific examples are provided to more clearly illustrate the method of preparing the new compositions of our invention. In order to increase yields and improve the reaction rate it is preferred to conduct the final step of the reaction in the presence of an alkali metal alcoholate catalyst especially sodium methoxide.

EXAMPLE 1

Preparation of 3-(2'-bromo-6'-chlorobenzylidene) phthalide

An intimate mixture of finely powdered phthalic anhydride (0.043 mole), 2-bromo-6-chlorophenylacetic acid (0.05 mole), and freshly fused sodium acetate (0.4 gram) was heated at 280° C. for 3 to 4 hours (until water evolution ceased) in a flask fitted with a still-head. After cooling to 100° C. the contents of the flask were poured into 100 ml. of ethanol and, after chilling, crystals were collected and recrystallized from an appropriate solvent. Using this procedure there was obtained 3-(2'-bromo-6'-chlorobenzylidene) phthalide (38 percent), M.P. 153–156° C. (from methanol).

Analysis.—Calc'd for $C_{15}H_8BrClO_2$ (percent): C, 53.68; H, 2.40. Found (percent): C, 53.42; H, 2.47.

EXAMPLE II

Preparation of 3-(2'-bromo-6'-chlorophenyl)-1,3-indandione

A stirred suspension or solution of 3-(2'-bromo-6'-chlorobenzylidene) phthalide (0.091 mole) in 150 ml. of methanol was treated with a solution of sodium (0.135 mole) in 100 ml. of methanol. After the resulting solution was refluxed for 1 to 2 hours it was cooled and poured into water. The resulting solution was acidified with concentrated hydrochloric acid to give the desired 2-phenyl-1,3-indandione which was purified by recrystallization from ethanol. There was thus obtained 3-(2'-bromo-6'-chlorophenyl)-1,3-indandione (71 percent), M.P. 188–190° C.

*Analysis.*—Calc'd for $C_{15}H_8BrClO_2$ (percent): C, 53.68; H, 2.40. Found (percent): C, 53.58; H, 2.29.

EXAMPLE III

Preparation of 3-(2'-chloro-6'-fluorobenzylidene) phthalide

An intimate mixture of finely powdered phthalic anhydride (0.043 mole), 2-chloro-6-fluorophenylacetic acid (0.05 mole), and freshly fused sodium acetate (0.4 gram) was heated at 280° C. for 3 to 4 hours (until water evolution ceased) in a flask fitted with a still-head. After cooling to 100° C. the contents of the flask were poured into 100 ml. of ethanol and, after chilling, crystals were collected and recrystallized from an appropriate solvent. Using this procedure there was obtained 3-(2'-chloro-6'-fluorobenzylidene) phthalide (46 percent), M.P. 162–167° C. (from benzene).

*Analysis.*—Calc'd for $C_{15}H_8ClFO_2$ (percent): C, 65.59; H, 2.93. Found (percent): C, 65.67; H, 2.83.

EXAMPLE IV

Preparation of 3-(2'-chloro-6'-fluorophenyl)-1,3-indandione

A stirred suspension or solution of 3-(2'-chloro-6'-fluorobenzylidene) phthalide (0.091 mole) in 150 ml. of methanol was treated with a solution of sodium (0.135 mole) in 100 ml. of methanol. After the resulting solution was refluxed for 1 to 2 hours it was cooled and poured into water. The resulting solution was acidified with concentrated hydrochloric acid to give the desired 2-phenyl-1,3-indandione which was purified by recrystallization from ethanol. There was thus obtained 3-(2'-chloro-6'-fluorophenyl)-1,3-indandione (80 percent), M.P. 121–124° C.

*Analysis.*—Calc'd for $C_{15}H_8ClFO_2$ (percent): C, 65.59; H, 2.93. Found (percent): C, 65.82; H, 2.86.

EXAMPLE V

Preparation of 2-(2'-chloro-6'-methylphenyl)-1,3-indandione

To a solution of 9.6 g. (0.3 mole) of sodium metal in 100 ml. of methanol was added with stirring a solution of 18 g. (0.117 mole) of 2-chloro-6-methylbenzaldehyde and 15.05 g. (0.118 mole) of phthalide in 60 ml. of ethyl acetate. After 1 hour at reflux most of the ethyl acetate and methanol was removed in vacuo from the reaction mixture and the residue was dissolved in 300 ml. of water and, after filtration, the resulting solution was acidified with concentrated hydrochloric acid. The solid which separated was collected and recrystallized from ethanol to provide 10 g. (31.9 percent) of product, M.P. 145–152° C.

*Analysis.*—Calc'd for $C_{16}H_{11}ClO_2$ (percent): C, 70.98; H, 4.09. Found (percent): C, 70.82; H, 4.01.

The following compounds, representative of those used in this invention, were tested with respect to their miticidal and herbicidal activity:

2-(2'-bromo-6'-chlorophenyl)-1,3-indandione
2-(2'-chloro-6'-fluorophenyl)-1,3-indandione
2-(2'-chloro-6'-methylphenyl)-1,3-indandione Suspensions of the test compounds were prepared by dissolving one gram of compound in 50 milliliters of acetone in which had been dissolved 0.1 gram (10 percent of the weight of compound) of an alkylphenoxyethanol surfactant, as an emulsifying or dispersing agent. The resulting solution was mixed into 150 milliliters of water to give roughly 200 milliliters of a suspension containing the compound in finely divided form. The thus-prepared stock suspension contained 0.5 percent by weight of compound. The test concentrations employed in the tests described hereinbelow were obtained by diluting the stock suspension with water. Dilution tests were carried out to determine the $LD_{50}$ and $LD_{95}$ (concentration of chemical required to kill fifty and ninety-five percent, respectively, of the mite population) values for each test compound. The test procedures were as follows:

Mite foliage spray test: Adults and nymphal stages or the two-spotted mite (*Tetranychus urticae* (Koch)), reared on Tendergreen bean plants at 80±5° F. and 50±5 percent relative humidity, were the test organisms. Infested leaves from a stock culture were placed on the primary leaves of two bean plants six to eight inches in height, growing in a two-and-a-half inch clay pot. 150–200 mites, a sufficient number for testing, transferred from the excised leaves to the fresh plants in a period of twenty-four hours. Following the twenty-four hour transfer period, the excised leaves were removed from the infested plants. The test compounds were formulated by diluting the stock suspension with water to provide suspensions containing varying amounts of test compound per million parts of final formulation. The potted plants (one pot per compound) were placed on a revolving turntable and sprayed with 100–110 milliliters of test compound formulation by use of a DeVilbiss spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants. The sprayed plants were held at 80+5° F. and 50+5 percent relative humidity for six days, after which a mortality count of motile forms was made. Microscopic examination for motile forms was made on the leaves of the test plants. Any individual which was capable of locomotion upon prodding was considered living.

Mite ovicide test: The test organism was the egg of the two-spotted mite (*Tetranychus urticae* (Koch)), as obtained from adults reared on Tendergreen bean plants under controlled conditions of 80±5° F. and 50±5 percent relative humidity. Heavily infested leaves from a stock culture were placed on the primary leaves of two bean plants six to eight inches in height, growing in a two-and-a-half inch clay pot. Females were allowed to oviposit for a period of 48 hours and then the leaves of the infested plants were dipped in a solution containing 800 parts of tetraethyl pyrophosphate per million parts of water in order to destroy the reproductory forms and thus prevent further egg laying. This solution of tetraethyl pyrophosphate does not affect the viability of the eggs. The plants were allowed to dry thoroughly. The test compounds were formulated by diluting the stock suspension with water to give a suspension containing varying amounts of test compound per million parts of final formulation. The potted plants (one pot per compound) were placed on a revolving turntable and sprayed with 100–110 milliliters of test compound formulation by use of a DeVilbiss spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on plants infested with eggs. The sprayed plants were held at 80±5° F. and 50±5 percent relative humidity for six days, after which a microscopic examination was made of unhatched (dead) and hatched (living) eggs.

Preliminary herbicide seed germination test.—The following seeds are used in this test:

Perennial rye grass—*Solium perene*
Crabgrass—*Digitaria sanguinalis*
Red root pigweed—*Amaranthus retroflexus*
Mustard—*Brassica pincea* var. *foliosa* (Florida broadleaf)

Two seed-soil mixtures are prepared as follows:

Mixture I:                                            Cc.
    Rye grass seed _____ 196
    Mustard seed _____ 75
Sifted, fairly dry soil _____ 18,000
Mixture II:                                           Cc.
    Crabgrass seed _____ 99
    Amaranthus _____ 33
Sifted, fairly dry soil _____ 18,000

Each of above mixtures is rolled separately in 5 gallon containers for approximately one-half hour on ball mill to insure uniform mixing of seeds and soil. For each compound four 3-inch pots are filled with soil to within 1½ inches of top of pots. To 2 of these pots are added 70 cc. of Mixture I. To the remaining 2 pots are added 70 cc. of Mixture II. The seed-soil mixture is tamped firmly, and the pots are removed to greenhouse and watered lightly. About 2 hours after planting, 25 milliliters of the test solution are added to each of 2 pots for each soil-seed mixture; i.e., one replicate of each seed mixture per concentration. An equal volume of water solution containing acetone and an emulsifier in the same concentration as the herbicidal mixture but without the candidate herbicide is also added to each of the soil-seed mixtures. These pots are used as check or control units. The test compounds are formulated by a standard procedure of solution in acetone, addition of an emulsifier, and dilution with water. Preliminary tests are conducted at 1000 p.p.m. and 100 p.p.m. The pots are held in the greenhouse and watered lightly until results are taken. Ten to twelve days after application of chemical, injury is noted for each species by comparing treated vs. untreated pots. Ratings are made at both the high and the low concentrations (1000 p.p.m. and 100 p.p.m.) according to the following designations:

5=no seedlings emerged
4=few seedlings emerged and/or very severe stunting
3=moderate reduction in stand and/or moderate stunting
2=very slight reduction in stand and/or slight stunting
1=no injury; seedlings appear no different with respect to stand or growth than untreated controls Accordingly, the maximum rating for one test seed species is 10 and the maximum possbile total preemergence rating is 40 (10 for each of the four test seed species).

The test data are set forth in the following table:

TABLE I

| Compound | Miticidal | | | | Herbicidal total preemergence |
|---|---|---|---|---|---|
| | Adult | | Ova | | |
| | LD$_{50}$ | LD$_{95}$ | LD$_{50}$ | LD$_{95}$ | |
| 2-(2'-bromo-6'-chlorophenyl)-indan-1,3-dione | 6 | 500 | 25 | 55 | 29 |
| 2-(2'-chloro-6'-fluorophenyl)-indan-1,3-dione | 35 | 500 | 45 | 120 | 25 |
| 2-(2'-chloro-6'-methylphenyl)-indan-1,3-dione | 10 | 200 | 18 | 50 | 29 |

The new compounds of this invention may be applied as miticides and herbicides according to methods known to those skilled in the art. Pesticidal compositions containing the compounds as the active toxicant will usually comprise a carrier and/or a diluent, either liquid or solid.

Suitable liquid diluents or carriers include water, petroleum distillates, or other liquid carriers with or without surface active agents. Liquid concentrates may be prepared by dissolving one of these compounds with a non-phytotoxic solvent such as acetone, xylene, or nitrobenzene and dispersing the toxicants in water with the aid of suitable surface active emulsifying and dispersing agents.

The choice of dispersing and emulsifying agents and the amount employed is dictated by the nature of the composition and the ability of the agent to facilitate the dispersion of the toxicant. Generally, it is desirable to use as little of the agent as is possible, consistent with the desired dispersion of the toxicant in the spray so that the rain does not remulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fullers earth, and the like. In the formulation of the wettable powders the aforementioned dispersing agents as well as lignosulfonates can be included.

The required amount of the toxicants contemplated herein may be applied per acre treated in from 1 to 200 gallons or more liquid carrier and/or diluent or in from about 5 to 500 pounds of inert solid carrier and/or diluent. The concentration in the liquid concentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre.

The pesticides contemplated herein prevent attack by mites upon plants or other material to which the pesticides are applied, and they have high residual toxicity. The toxicants are chemically inert and they are now compatible with substantially any other constituents of the spray schedule, and they may be used in the soil, upon the seeds, or the roots of those plants in which they induce no herbicidal effects.

What is claimed is:

1. As new compositions of matter, 2-(2',6'-substituted-phenyl)-1,3-indandione compounds of the formula:

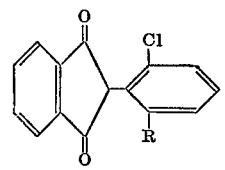

where R is fluorine or bromine.
2. 2-(2'-bromo-6'-chlorophenyl)-1,3-indandione.
3. 2-(2'-chloro-6'-fluorophenyl)-1,3-indanedione.

References Cited

UNITED STATES PATENTS 3,389,986   6/1968   Dibella _____ 260—590 X
3,622,632   11/1971   Holland et al. _____ 260—590

FOREIGN PATENTS 245,170   9/1962   Australia _____ 260—590

OTHER REFERENCES

C. Bruynes et al., Recevil vol. 85, pp. 1259–63 (1966).

DANIEL D. HORWITZ, Primary Examiner

U.S. Cl. X.R.

71—123